Patented July 18, 1939

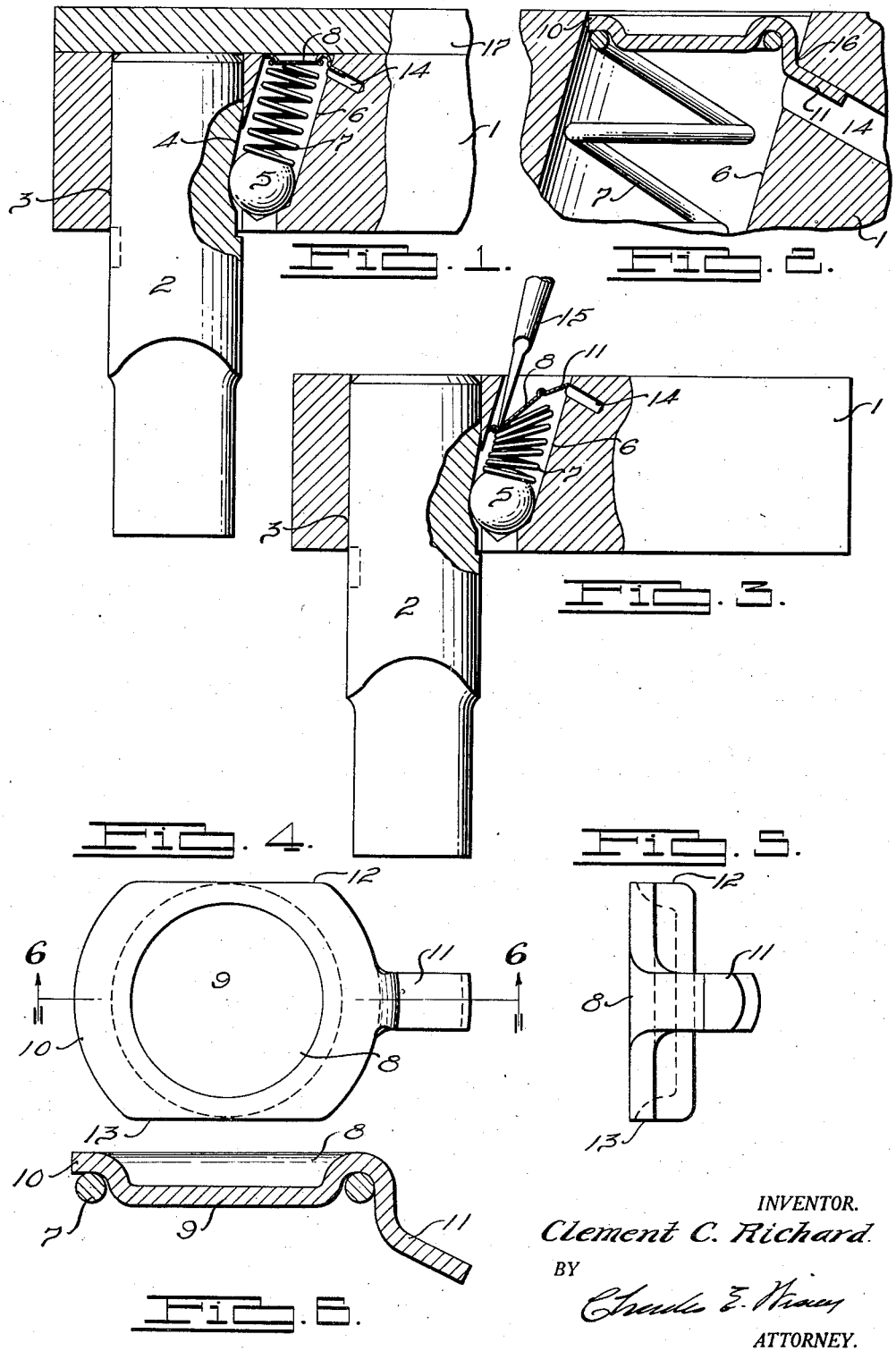

2,166,559

UNITED STATES PATENT OFFICE 2,166,559

SPRING RETAINER

Clement C. Richard, Bloomfield Hills, Mich., assignor to Allied Products Corporation, Detroit, Mich., a corporation of Michigan Application December 13, 1937, Serial No. 179,528

5 Claims. (Cl. 279—30)

This invention relates spring retainers such as are used in pressing a ball to a seat in a retainer for punches, dies and the like.

Heretofore, in the formation of such retainers, for punches or dies, an angular aperture is formed opening through one face of the retainer and opening into a punch aperture therein at one side. A backing plate is usually used with such retainer and covering the aperture for the ball and spring but usually these springs tend to extend outwardly of the apertures even though the outer end of the terminal coil of the spring be introduced in a notch or recess in the wall of the aperture as has been commonly the practice. This invention seeks to provide an inexpensive retainer for holding the end of the spring centrally of the aperture and thus supports the same in a superior manner from the previous method of inserting an end only of the terminal coil in a notch.

The invention further contemplates the ready removal of the retainer and also involves a construction providing for locking of the retainer in place by the spring pressure.

These various objects and novel features of the invention are hereinafter more fully described and claimed, and the preferred form of construction of a spring retainer embodying my invention is shown in the accompanying drawing in which—

Fig. 1 is a vertical section of a punch retainer and a spring-pressed ball lock with which my spring retainer may be associated.

Fig. 2 is an enlarged sectional view of the retainer and end of the spring engaging thereagainst.

Fig. 3 is an elevation showing the manner of withdrawal of the retainer from its spring retaining position.

Fig. 4 is a plan view of my improved retainer on an enlarged scale.

Fig. 5 is a side view taken from the right side of Fig. 4.

Fig. 6 is a longitudinal section on line 6—6 of Fig. 4.

This retainer is adapted to provide a seat for a coiled spring insertable in a recess as for instance a recess for a lock element in a punch retainer or other character of structure in which the spring requires to be inserted into an aperture which it approximately fits and requires that the end of the spring be supported approximately at the mouth of the recess.

This general arrangement is shown in Fig. 1 in which the retainer body is indicated at 1, a punch indicated at 2 insertable in an aperture 3 therefor in the retainer body, the punch shank having a notch 4 in its face to receive a ball 5 located in the angularly disposed aperture 6 opening into the punch aperture 3 as shown. This is the general character of retainer shown in the U. S. Patent No. 1,621,811 to O. K. Richard and C. C. Richard.

In the present invention the ball is pressed to place by a coiled spring 7 seated at one end on the ball and the opposite end is held by my improved retainer 8. This retainer is formed of stacked sheet metal and has a circular depressed portion 9 and a rim 10 at its forward edge projecting over the end coil of the spring 7 and also extending over the spring at the rear edge, which edge is provided with an angularly disposed narrow lug 11.

The diameter of which I have termed the rim portion 10 is approximately that of the aperture 6 but the rim does not form a true circle as the opposite side edges are cut away at 12 and 13 forming parallel side faces of a distance apart practically equal to the diameter of the under face of the depressed portion 9 as will be understood from Figs. 4 and 6.

The spring recess near the surface of the block to which it opens is provided on one side with an angularly disposed recess 14, as shown in Figs. 1 and 2, to receive the angularly disposed lug or tail 11 of the retainer. The retainer, as will be observed in Fig. 3, may be forced into the aperture over the spring as by means of a pointed assembly tool 15 applied to the forward edge thereof. This causes the retainer 8 to occupy an angular position and upon introduction sufficiently far into the recess 6 as the lug 11 may enter its recess 14. As this lug or tail portion 11 slips into the recess the tool 15 may be released. The spring thereupon forces the retainer 8 outwardly to its retaining position.

In this movement the retainer will swing about the point 16 as an axis due to spring pressure and the distance from this point of pivoting to the forward edge of the retainer flange 10 is slightly greater than the distance across the aperture 6 and thus as this retainer swings to place it assumes a position as shown in Fig. 2, with the edge portion 10 in wedging contact with the inner face of the spring aperture 6. In this final position the retainer is approximately parallel with and slightly below the face of the block 1 in which it is mounted. This act of introducing the spring and its retainer, as illustrated in Fig. 3, is very simple and by repetition of the act the retainer may be brought to position with the lug 11 moved out of its recess 14 whereupon upon release of the implement the spring retainer may be removed.

A feature of the invention is in the provision of a retainer plate that is insertable in the recess for the spring and comes to a wedging relationship with the retainer body in the recess by the spring pressure to provide a solid support for the end of the spring. The two side edges being cut away as at 12 and 13 permits this ready movement of the retainer into and out of the recess for the spring as indicated in Fig. 2.

My improved spring retainer is particularly adaptable for use in conjunction with a retainer for punches, dies and the like where an automatic lock element such as the ball 5 is used in that the face of the block in which the ball and spring are mounted is desirably kept free from projecting spring ends and does not interfere with ready association of the backing plate 17 shown in Fig. 1. The retainer is also usable with other types of spring-pressed lock elements other than the ball type here shown, as for instance the pin lock type as shown in my U. S. Patent No. 1,974,217, or other forms of lock elements for tool retainers. However, the retainer is not restricted to such use as it may be utilized with any structure in which a spring requires to be introduced into an aperture and its outer end sustained in place or held in position under tension.

Having thus fully described my invention, its utility and mode of operation, what I claim and desire to secure by Letters Patent of the United States is—

1. A retainer providing a seat for a spring located in an aperture of a body comprising a disk like member having a central depressed portion, a projecting rim on two opposite side edges thereof having a radius approximating that of the spring aperture, the two remaining sides being of less distance across, said spring aperture having a second aperture opening thereinto, a lug extending from one of the radial edges of the body adapted for insertion in the said second aperture, the disk and lug being so formed that the pressure of the spring tends to turn the disk about the point of contact of the lug with the edge of its aperture as a center and thereby force the opposite arcuate edge of the body into wedging contact with the wall of the spring aperture opposite the lug.

2. A retainer for supporting a coiled spring in an aperture of a body comprising a disk like body having a narrow lug extending from one edge thereof at an angle to the plane thereof, the aperture for the spring having a recess opening thereinto and lying at approximately a right angle to the axis of the spring recess for receiving the said lug, the said lug having a comparatively sharp angle at its point of contact with the disk and the distance from the said angular point to a diametrically opposite peripheral edge of the disk body being such that upon compression of the spring and introduction of the said lug in its recess, the retainer turns about said point of contact of the lug with the body as an axis and forcing the diametrically opposite edge into wedging contact with the opposite face of the spring aperture.

3. The combination with a block having an aperture opening through its face and extending into the block at less than a right angle to its face, of a coiled spring insertible in the aperture, means for holding the spring in the aperture under tension, comprising a disk like element having a lug like portion on one edge insertible in an aperture provided therefor opening into the spring aperture adjacent the face of the block, the said disk at the edge opposite the lug engaging the wall of the aperture and maintaining the disk practically parallel with and below the surface of the block to which the aperture opens.

4. A retainer for the ends of helical springs insertible in an aperture in a block in which there is also a secondary aperture opening to the spring aperture on one side at an angle to the axis thereof, comprising a sheet metal element of disk like character shaped to provide a seat for the end of the helical spring and having a lug extending from one edge thereof at an angle to the plane of the body for association in the said secondary aperture, the distance from the point of contact of the lug with the block at the junction of the spring aperture and secondary apertures to the diametrically opposite edge being such that said opposite edge is forced to engagement with the wall of the spring aperture thereby holding the spring in position under tension, the disk being of less width transversely of a line connecting said contact point permitting the same to be moved into the spring aperture from the said edge in contact with the wall of the aperture to thereby withdraw the lug from the secondary aperture.

5. A spring retainer comprising a stamped sheet metal element having a body of disk like form with parallel sides and arcuate ends, the distance across the arcuate ends being greater than between the parallel sides, and a narrow lug extending from one of the arcuate end portions at an angle to the body providing a structure for insertion in a spring aperture of circular cross section with the lug extending into an aperture opening into the spring aperture substantially as and for the purpose described.

CLEMENT C. RICHARD.